(12) United States Patent
Amada et al.

(10) Patent No.: US 8,174,747 B2
(45) Date of Patent: May 8, 2012

(54) OPTICAL SCANNING APPARATUS AND IMAGE FORMING APPARATUS

(75) Inventors: Taku Amada, Yamato (JP); Atsuhiko Ogawa, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 307 days.

(21) Appl. No.: 12/490,437

(22) Filed: Jun. 24, 2009

(65) Prior Publication Data

US 2009/0323147 A1    Dec. 31, 2009

(30) Foreign Application Priority Data

Jun. 30, 2008 (JP) ................................. 2008-170643

(51) Int. Cl.
G02B 26/08 (2006.01)

(52) U.S. Cl. .................. 359/204.2; 359/205.1; 347/242

(58) Field of Classification Search ............... 359/204.1, 359/204.2, 205.1, 206.1, 207.1, 216.1–219.1, 359/217.1, 217.2; 347/242, 245, 263; 399/151
See application file for complete search history.

(56) References Cited

U.S. PATENT DOCUMENTS

| | | | |
|---|---|---|---|
| 5,208,612 A * | 5/1993 | Obu et al. ..................... 347/152 |
| 5,952,649 A | 9/1999 | Amada | |
| 6,621,512 B2 | 9/2003 | Nakajima et al. | |
| 6,771,300 B2 | 8/2004 | Amada et al. | |
| 7,050,082 B2 | 5/2006 | Suzuki et al. | |
| 7,145,589 B2 | 12/2006 | Amada et al. | |
| 7,206,014 B2 | 4/2007 | Amada et al. | |
| 7,333,254 B2 | 2/2008 | Amada et al. | |
| 7,403,316 B2 | 7/2008 | Amada | |
| 7,417,662 B2 * | 8/2008 | Wing et al. ..................... 347/263 |
| 7,450,274 B2 | 11/2008 | Itabashi et al. | |
| 7,460,145 B2 | 12/2008 | Amada et al. | |
| 7,505,060 B2 | 3/2009 | Amada et al. | |
| 7,528,856 B2 * | 5/2009 | Kato et al. ..................... 347/242 |
| 7,760,228 B2 * | 7/2010 | Mamiya ........................ 347/257 |
| 7,791,633 B2 * | 9/2010 | Wada et al. ..................... 347/242 |
| 7,800,846 B2 * | 9/2010 | Park .............................. 359/811 |
| 8,027,075 B2 * | 9/2011 | Serizawa .................... 359/206.1 |
| 8,054,326 B2 * | 11/2011 | Endo et al. ..................... 347/242 |
| 2004/0036936 A1 | 2/2004 | Nakajima et al. | |
| 2004/0125192 A1 * | 7/2004 | Ohsugi ......................... 347/233 |
| 2005/0206717 A1 * | 9/2005 | Boyatt et al. .................. 347/242 |
| 2006/0132880 A1 | 6/2006 | Amada et al. | |
| 2006/0209166 A1 | 9/2006 | Suzuki et al. | |
| 2006/0209171 A1 * | 9/2006 | Shiraishi ........................ 347/259 |
| 2006/0232660 A1 | 10/2006 | Nakajima et al. | |
| 2006/0238845 A1 | 10/2006 | Atsuumi et al. | |
| 2007/0081152 A1 | 4/2007 | Amada | |

(Continued)

FOREIGN PATENT DOCUMENTS

JP         2005-92129         4/2005

(Continued)

*Primary Examiner* — Frank Font
(74) *Attorney, Agent, or Firm* — Dickstein Shapiro LLP

(57) ABSTRACT

An optical scanning apparatus for scanning a surface to be scanned includes: a light source that emits laser beam; a deflector that deflects the laser beam emitted from the light source; a plurality of optical scanning elements that introduce the deflected laser beam to the surface to be scanned; a housing that holds therein at least one of the light source, the deflector, and the scanning optical elements; a light receiving element that receives the deflected laser beam; a mirror that introduces the deflected laser beam to the light receiving element; and a holder that is provided on the housing and that holds the light receiving element and the mirror integrally.

8 Claims, 12 Drawing Sheets

U.S. PATENT DOCUMENTS

| | | | |
|---|---|---|---|
| 2007/0122192 A1* | 5/2007 | Yamakawa et al. | 399/151 |
| 2008/0062245 A1* | 3/2008 | Wing et al. | 347/263 |
| 2008/0069585 A1 | 3/2008 | Amada | |
| 2008/0117487 A1 | 5/2008 | Amada et al. | |
| 2008/0170282 A1 | 7/2008 | Amada et al. | |
| 2008/0204852 A1 | 8/2008 | Amada et al. | |
| 2008/0239433 A1 | 10/2008 | Amada et al. | |
| 2009/0059335 A1 | 3/2009 | Amada et al. | |
| 2009/0060583 A1 | 3/2009 | Amada et al. | |

FOREIGN PATENT DOCUMENTS

| | | |
|---|---|---|
| JP | 2005-208513 | 8/2005 |
| JP | 2006-126506 | 5/2006 |
| JP | 2006-227527 | 8/2006 |
| JP | 2006-243312 | 9/2006 |
| JP | 4027870 | 10/2007 |
| JP | 2009-75541 | 4/2009 |

* cited by examiner

OPTICAL SCANNING APPARATUS AND IMAGE FORMING APPARATUS

CROSS-REFERENCE TO THE RELATED APPLICATION

The present application is based on and claims priority from Japanese Application Number 2008-170643, filed on Jun. 30, 2008, the disclosure of which is hereby incorporated by reference herein in its entirety.

BACKGROUND OF THE INVENTION

1. Field of the Invention

The present invention relates to an optical scanning apparatus and an image forming apparatus and, in particular, to an optical scanning apparatus which scans a surface to be scanned (i.e., a surface which is an object of scanning), and an image forming apparatus which is provided with the optical scanning apparatus.

2. Description of the Related Art

As an image forming apparatus which forms an image by using a laser beam, there is known an image forming apparatus which forms an image by: scanning the surface of a rotating photoreceptor drum with a laser beam to thereby form a latent image on the surface of the photoreceptor drum; obtaining a toner image by visualizing the latent image; and then fixing the toner image on a piece of paper as a recording medium.

Regarding this kind of image forming apparatus, there has recently been proposed an apparatus in which: a light source device, a deflector, and even a scanning lens are contained in a single core housing made, e.g., of a resin molding or an aluminum die-casting; and optical parts such as a folding mirror for folding an optical path, scanning lens and the like which are disposed between the deflector and the photoreceptor drum are contained in a sub-housing which is integrally formed with the above-described core housing (see, e.g., patent document 1) JP-A-2006-126506 and patent document 2) Japanese Patent No. 4027870).

In the apparatuses described in the above patent documents 1) and 2), even in case the distance between the adjoining photoreceptor drums may have been changed due, e.g., to design changes, the core housing can still be used in common. Therefore, the period for development can be shortened and the parts can be used in common with each other, resulting in a reduction in manufacturing cost of the apparatus.

In a tandem type of color image forming apparatus (optical scanning apparatus), it is necessary to overlap the images (toner images) on the photoreceptor drums corresponding to respective colors of toners with high accuracy. For this purpose, the optical scanning apparatus must detect the scanning position (particularly, the position in the sub-scanning direction) on each of the photoreceptor drums corresponding to the respective colors, and then correct the scanning position depending on the result of detection (see, e.g., patent document 3) JP-A-2005-208513).

In general, in an optical scanning apparatus to be used in an image forming apparatus, there is disposed a synchronous detection sensor for detecting the timing of writing in the scanning region which corresponds to the image region (exposure region), on an outside of the scanning region. Therefore, as the laser beam for synchronous detection, there is used a laser beam a part of which is separated just before entering the scanning region on the surface to be scanned. The separated laser beam is incident on the synchronous detection sensor by optical element such as a mirror.

As a result, in an optical scanning apparatus in which a plurality of folding mirrors are disposed on the laser beam path from the deflector to the surface to be scanned (surface of the photoreceptor drum), there are often cases where the optical path (synchronized beam path) from the deflector to the synchronized detection sensor must be disposed on both outer sides of the folding mirrors, resulting in a great deal of restriction in mechanical layout. In particular, in case of the apparatus having two-part housing, it was difficult to secure an optical path for the synchronous beam because the folding mirrors are bridged between the opposite side plates.

In addition, the detector to detect the scanning position by the laser beam must be mounted accurately on a predetermined mounting position. For example, if the relative positional relationship between the detector and each of the optical elements varies after a lapse of time or with a change in temperature, deviation may occur in the relationship between the scanning position on the photoreceptor drum (on the surface to be scanned) and the scanning position to be detected by the detecting sensor, resulting in a disadvantage in that the scanning position cannot be detected accurately.

SUMMARY OF THE INVENTION

A first object of the present invention is to provide an optical scanning apparatus in which the laser beam can be accurately detected and in which, based on the result of the detection, the surface to be scanned can be scanned with high accuracy.

A second object of the present invention is to provide an image forming apparatus which is capable of forming a high definition image with high accuracy.

According to the invention, there is provided an optical scanning apparatus for scanning a surface to be scanned, comprising: a light source that emits laser beam; a deflector that deflects the laser beam emitted from the light source; a plurality of scanning optical elements that introduce the deflected laser beam to the surface to be scanned; a housing that holds therein at least one of the light source, the deflector, and the scanning optical elements; a light receiving element that receives the deflected laser beam; a mirror that introduces the deflected laser beam to the light receiving element; and a holder that holds the light receiving element and the mirror integrally, the holder being provided on the housing.

According to this configuration, the light receiving element that receives the deflected laser beam and the mirror that introduces the deflected laser beam to the light receiving element are integrally held by the holder. This holder is disposed on the housing that holds at least one of the light source, the deflector and the scanning optical element. According to this configuration, the positional relationship of the light receiving element relative to the mirror is maintained constant. Also the positional relationship of the light receiving element relative to at least one of the light source, the deflector, and the scanning optical element can also be maintained constant. Therefore, it becomes possible to detect the laser beam by the light receiving element with high accuracy, with the result that the image can be formed with high accuracy.

According to another aspect of the invention, there is provided an image forming apparatus in which a toner image formed based on a latent image to be obtained from information relating to an image is fixed to a recording medium, thereby forming an image. The apparatus comprises: the optical scanning apparatus according to the invention; a photoreceptor on which the latent image is formed by the optical scanning apparatus; a developing unit made visible the latent image formed on the surface to be scanned of the optical scanning apparatus; and a transfer unit that fixes the toner image made visible by the developing unit to the recording medium.

According to this configuration, a final image is formed based on the latent image formed by the optically well adjusted optical scanning apparatus. Therefore, it becomes possible to form an image on a recording medium with a high precision.

DETAILED DESCRIPTION OF THE PREFERRED EMBODIMENTS

A description will now be made of an embodiment with reference to the accompanying FIGS. 1 through 13.

Figure 1:
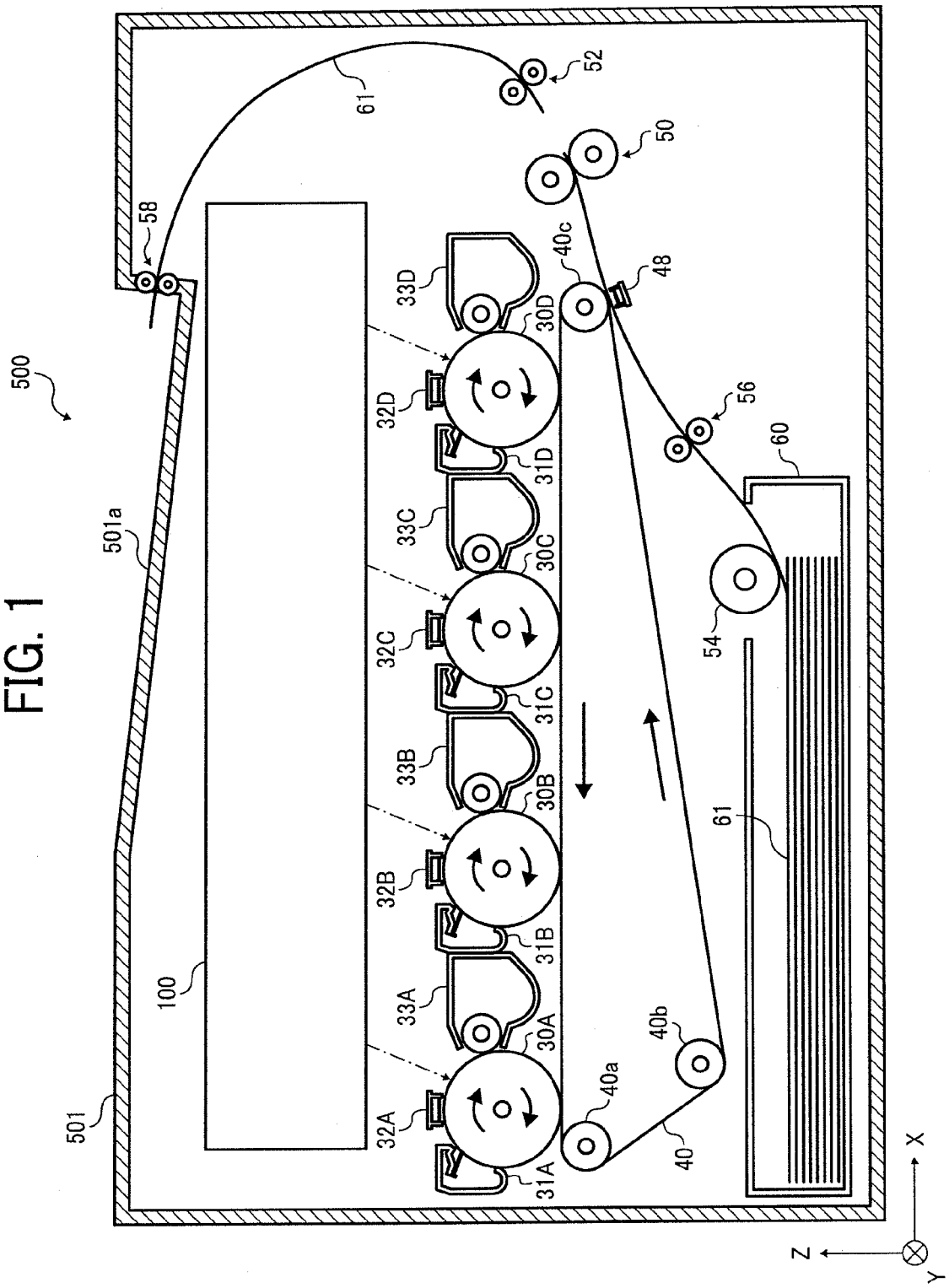
FIG. 1 is a schematic diagram showing a structure of an image forming apparatus according to the present invention.

FIG. 1 is a schematic diagram showing a general configuration of an image forming apparatus 500 of the invention.

The image forming apparatus 500 is a tandem type of color printer for printing a multi-color toner image in black, yellow, magenta, and cyan by transferring the image in an overlapped manner to a piece of ordinary paper. The image forming apparatus 500 is made up, as shown in FIG. 1, of an optical scanning apparatus 100; four photoreceptor drums 30A, 30B, 30C, 30D; a transfer belt 40; a paper feed tray 60; a paper feed roller 54; first resist rollers 56; second resist rollers 52; fixing rollers 50; paper discharge rollers 58; a control unit (not illustrated) which performs an overall control over each of the above-described units/parts; and a housing 501 which houses the above-described constituting parts.

The housing 501 has a paper discharge tray 501a which is formed on an upper surface of the housing 501 and which receives the printed pieces of paper. Below the paper discharge tray 501a is disposed an optical scanning apparatus 100.

The optical scanning apparatus 100 is configured to perform the following operations, i.e., relative to the photoreceptor drum 30A, scanning by laser beam of a black-color image component modulated on the basis of image information supplied by a higher-order apparatus (such as personal computers, and the like); relative to the photoreceptor drum 30B, scanning by laser beam of a cyan-color image component; relative to the photoreceptor drum 30C, scanning by laser beam of a magenta-color image component; and relative to the photoreceptor drum 30D, scanning by laser beam of a yellow-color image component. The detailed construction of the optical scanning apparatus 100 will be given hereinafter.

Four photoreceptor drums 30A, 30B, 30C, 30D are columnar members each having formed on the surface thereof a photosensitive layer of such a nature that the portion irradiated by laser beam becomes conductive. The photoreceptor drums are disposed below the optical scanning apparatus 100 in an X-axis direction at an equal distance to one another.

The photoreceptor drum 30A is disposed at a −X side end portion inside the housing 501 with a Y-axis direction lying as the longitudinal direction, and is arranged to be rotatable in a clockwise direction (direction as indicated by arrows) by a rotating mechanism (not illustrated). At a twelve-o-clock position (upper side) as seen in FIG. 1 there is disposed a charger 32A, a toner cartridge 33A at a two-o-clock position, and a cleaning case 31A at a ten-o-clock position.

The charger 32A is disposed at a given clearance to the surface of the photoreceptor drum 30A with the Y-axis direction as the longitudinal direction so that the surface of the photoreceptor drum 30A can be charged with a predetermined voltage.

The toner cartridge 33A is made up of: a cartridge main body which is filled with the toner of black-color image composition; a developing roller which is charged with voltage of reversed polarity relative to that of photoreceptor drum 30A; and the like. It supplies the surface of the photoreceptor drum 30A with the toner that is filled in the cartridge main body through the developing roller.

The cleaning case 31A is provided with a cleaning blade of rectangular shape with the Y-axis direction lying in the longitudinal direction, and is disposed such that one end of the cleaning blade comes into contact with the surface of the photoreceptor drum 30A. The toner adsorbed on the surface of the photoreceptor drum 30A is swept off by the cleaning blade as a result of rotation of the photoreceptor drum 30A, and is recovered into the cleaning case 31A.

The photoreceptor drums 30B, 30C, 30D have a construction equivalent to that of the photoreceptor drum 30A, and are disposed in sequence on a +X side of the photoreceptor drum 30A at a predetermined clearance from one another. On the outer circumference thereof there are respectively disposed chargers 32B, 32C, 32D; toner cartridges 33B, 33C, 33D; and cleaning cases 31B, 31C, 31D, respectively, in a positional relationship similar to that of the photoreceptor drum 30A.

The chargers 32B~32D are constituted in a similar manner as the charger 32A, and cause the surfaces of the photoreceptor drums 30B~30D to be charged with a predetermined voltage.

The toner cartridges 33B~33D are made up of: cartridge main bodies which are filled with the toner of cyan-color, magenta-color and yellow-color image compositions; developing rollers which are charged with voltage of reversed polarity relative to those of photoreceptor drums 30B~30D; and the like. They respectively supply the surfaces of the photoreceptor drums 30B~30D with the toner that is filled in the cartridge main bodies through the developing rollers.

The cleaning cases 31B~31D are constituted in a manner similar to that of the cleaning case 31A and function in a similar manner.

Hereinafter the photoreceptor drum 30A, the charger 32A, the toner cartridge 33A, and the cleaning case 31A are collectively referred to as a first station; the photoreceptor drum 30B, the charger 32B, the toner cartridge 33B, and the cleaning case 31B are collectively referred to as a second station; the charger 32C, the toner cartridge 33C, and the cleaning case 31C are collectively referred to as a third station; and the charger 32D, the toner cartridge 33D, and the cleaning case 31D are collectively referred to as fourth station.

The transfer belt 40 is an endless, annular member and is wound around: driven rollers 40a, 40c which are respectively disposed below the photoreceptor rollers 30A, 30D; and a driving roller 40b which is disposed at a slightly lower position than the driven rollers 40a, 40c, such that the upper surface of the transfer belt 40 is kept in contact with the respective lower surfaces of the photoreceptor drums 30A, 30B, 30C, and 30D. As a result of rotation of the driving roller 40b in counterclockwise direction as seen in FIG. 1, the transfer belt 40 is rotated in the counterclockwise direction (in the direction as indicated by arrows in FIG. 1). In addition, in the neighborhood of the +X side end portion of the transfer belt 40, there is disposed a transfer charger 48 to which is applied a voltage of reverse polarity relative to the chargers 32A, 32B, 32C, and 32D.

The paper feed tray 60 is disposed below the transfer belt 40. The paper feed tray 60 is substantially rectangular in shape and holds in stack pieces of paper 61 on which printing is made. On the +X side end portion on the upper surface of the paper feed tray 60 there is formed a paper feed opening which is rectangular in shape.

A paper feed roller 54 operates to pick up the paper 61 one at a time out of the paper feed tray 60 and introduces it, through first resist rollers 56 made up of a pair of rotary rollers, to the clearance to be formed by the transfer belt 40 and the transfer charger 48.

Fixing rollers 50 are made up of a pair of rotary rollers, operate to heat and pressurize the paper 61, and introduce the paper through second resist roller 52 to the paper discharge rollers 58.

Paper discharge rollers 58 are made up of a pair of rotary rollers and operate to hold in stack the introduced pieces of paper 61 in the paper discharge tray 501a.

A description is made of the construction of the optical scanning apparatus 100.

Figure 2:
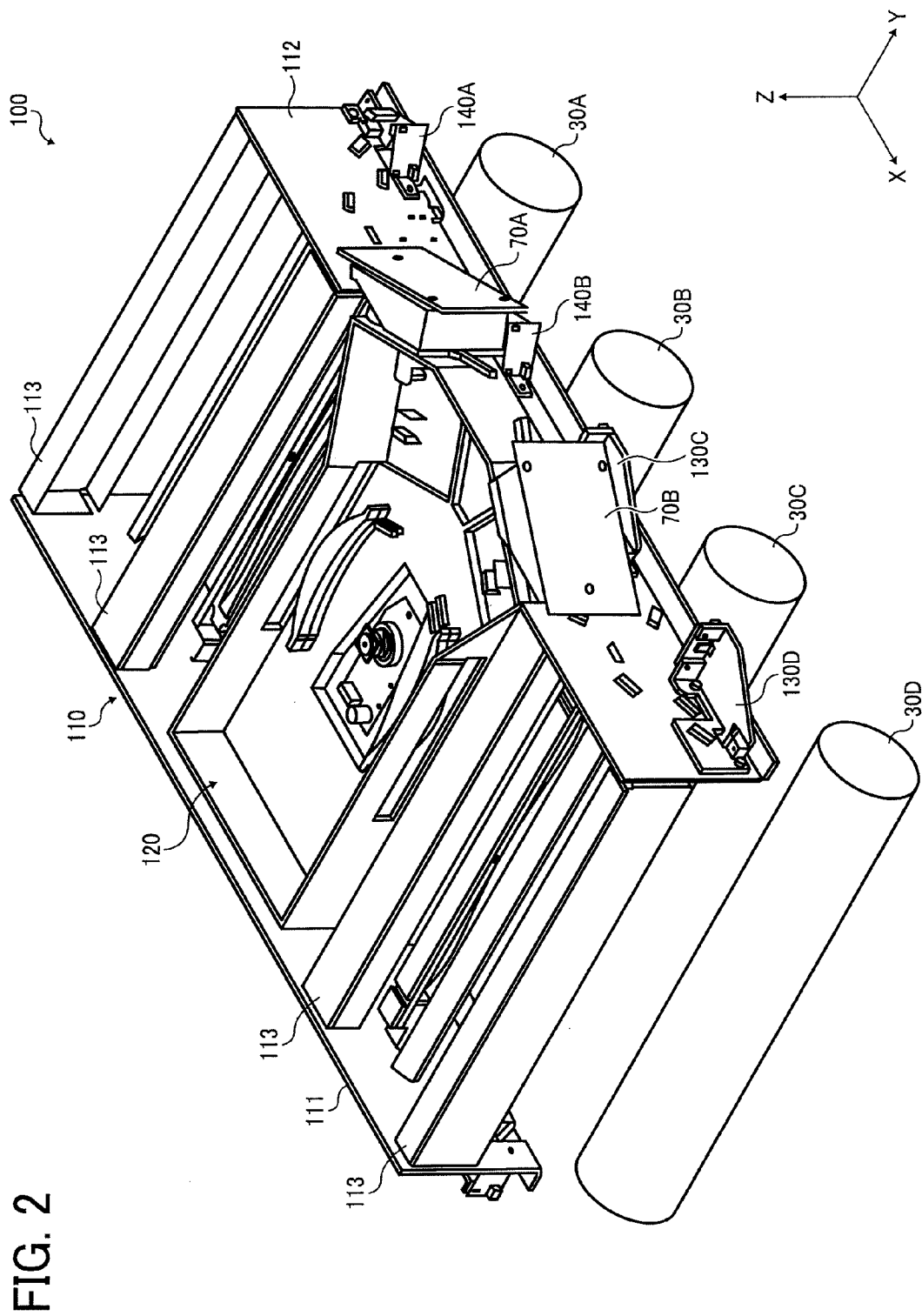
FIG. 2 is a perspective view showing an optical scanning apparatus according to the present invention.

FIG. 2 is a perspective view of the optical scanning apparatus 100. As shown therein, the optical scanning apparatus 100 includes: a core housing 120 to which are attached light source devices 70A, 70B, and the like; and a sub-housing 110 in which are housed an optical system which introduces the laser beam emitted from the core housing 120, and the like.

Figure 3:
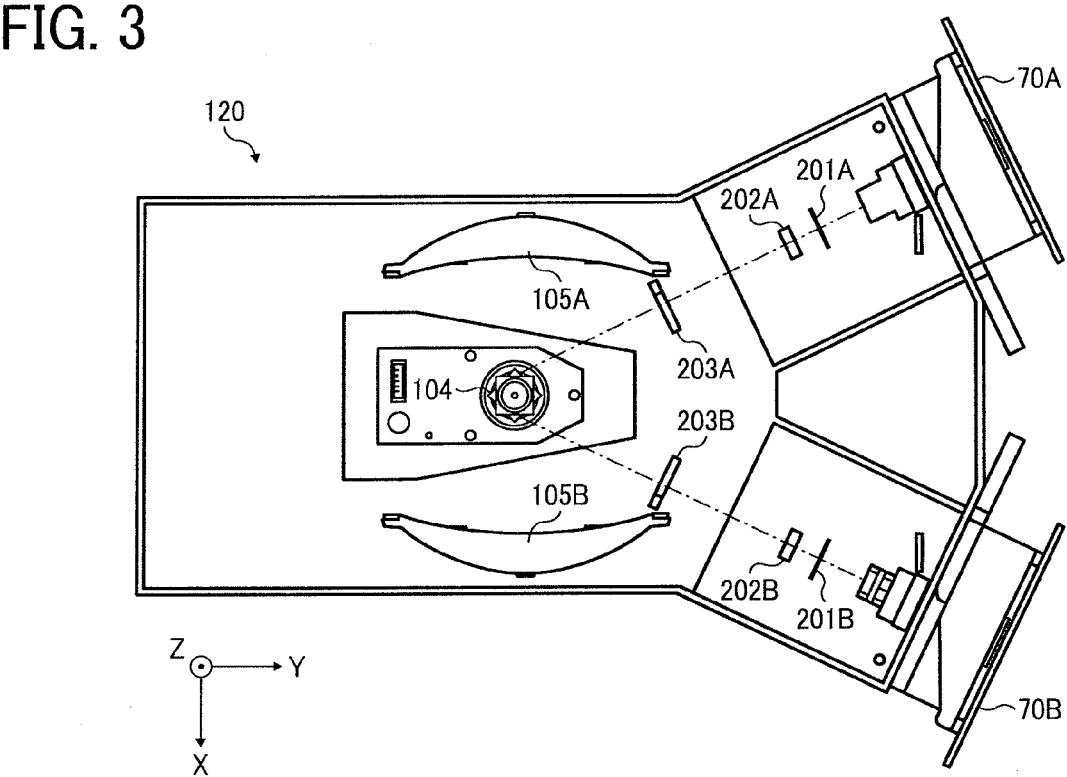
FIG. 3 is a plan view showing a core housing together with optical elements and so on housed in the core housing.

FIG. 3 is a plan view showing the core housing 120 together with the optical elements and the like that are housed therein. As shown in FIG. 3, the core housing 120 is an enclosure made, e.g., of aluminum die-casting and is made up of: a first part of rectangular shape as seen in plan view and contains therein a polygon mirror 104, a set of first scanning lenses 105A, 105B, and a set of cylindrical lens units 203A, 203B; and a second part in which the light source devices 70A, 70B are mounted in a state in which the respective optical axes are inclined relative to the Y axis, and in which aperture members 201A, 201B and split prisms 202A, 202B respectively disposed on the optical axes of the light source devices 70A, 70B are contained.

Figure 4:
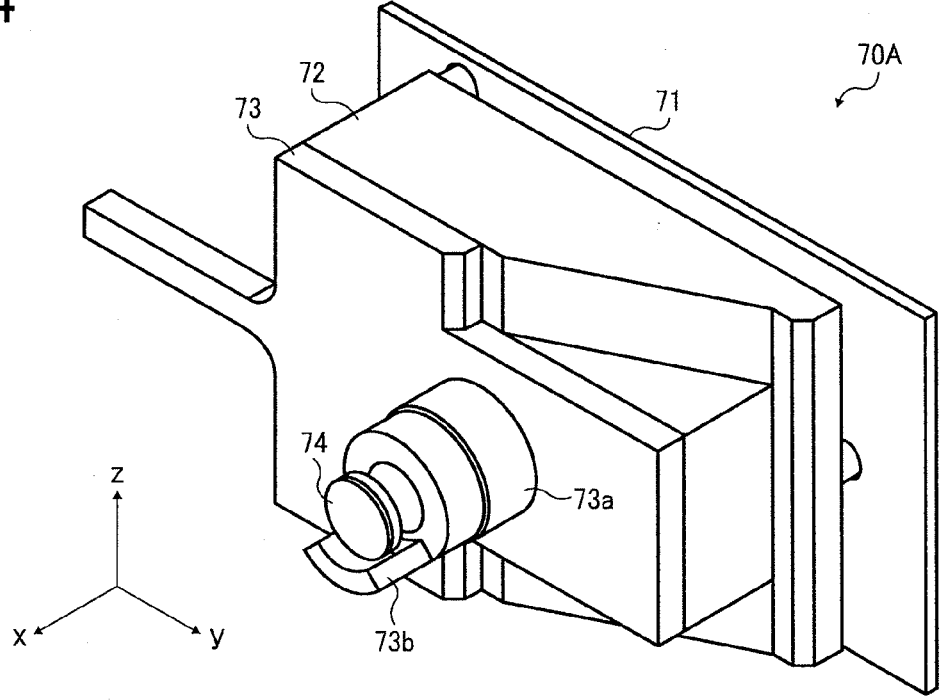
FIG. 4 is a perspective view of a light source unit.

FIG. 4 is a perspective view of the light source device 70A. The light source devices 70A, 70B are constructed in substantially equivalent manner. The light source device 70A shown in FIG. 4 as a representative example has a substrate 71 having mounted thereon a surface-emitting laser array such as VCSSEL in which the light sources are disposed in a two dimensional manner for emitting a plurality of laser beams, a supporting member 72 for supporting the substrate 71, and a lens support member 73 for supporting a coupling lens 74 that shapes each of the plurality of laser beams emitted from the laser array into substantially parallel light beams.

The lens support member 73 has formed therein: an annular projection 73a which projects in an annular form in the +X direction as seen in FIG. 4; and a support member 73b which is provided to extend from a lower end of the annular projection 73a, thereby supporting the coupling lens 74.

Each of the light source devices 70A, 70B is mounted in position on the core housing 120 by fitting it into an opening provided in a side wall of the core housing 120. In this state the optical axes of the coupling lenses 74 of the light sources 70A, 70B are arranged to become parallel with the XY plane in FIG. 3 and to cross each other at the central portion of the first part of the core housing 120.

Each of the aperture members 201A, 201B is disposed on the optical axis of the respective light source devices 70A, 70B and functions to shape the sectional shape of the laser beam emitted from the light source devices 70A, 70B.

Each of the split prisms 202A, 202B is disposed on the respective optical axes of the light source devices 70A, 70 so that the laser beams passing through the aperture members 201A, 201B can be split into two at a predetermined distance between the two in a vertical direction (in a sub-scanning direction).

Each of the cylinder units 203A, 203B has a set of cylindrical lenses which are disposed adjacent to each other corresponding to each of the separated laser beams. And the corresponding laser beams are condensed into the polygon mirror 104.

The polygon mirror 104 is disposed in approximately the center of the first part of the core housing 120 so as to be rotatable about a Z axis. The polygon mirror 104 is made up of a set of true square pole-shaped members having on a side surface deflection planes of the laser beams, each of the members being disposed adjacent to each other in the up and down direction in a state of being deviated from each other by 45 degrees in phase. By means of a rotating mechanism (not illustrated) the polygon mirror 104 is rotated about an axis which is parallel to the Z axis. The laser beams that are emitted from the light source devices 70A, 70B and are incident on the polygon mirror 104 are subjected to deflection scanning on the deflection planes that are different in phase by 45 degrees.

The first scanning lenses 105A, 105B are disposed on the −X side and on the +X side, respectively, of the polygon mirror 104. The first scanning lenses 105A, 105B have an image height proportional to the angle of incidence of the laser beams, and the image surface of the laser beams to be deflected at a certain angular velocity is moved at a constant velocity relative to the Y axis. The laser beams that have passed through the first lenses 105A, 105B are emitted through an opening formed in a side wall of the core housing 120 in a direction parallel to the XY plane.

Figure 5:
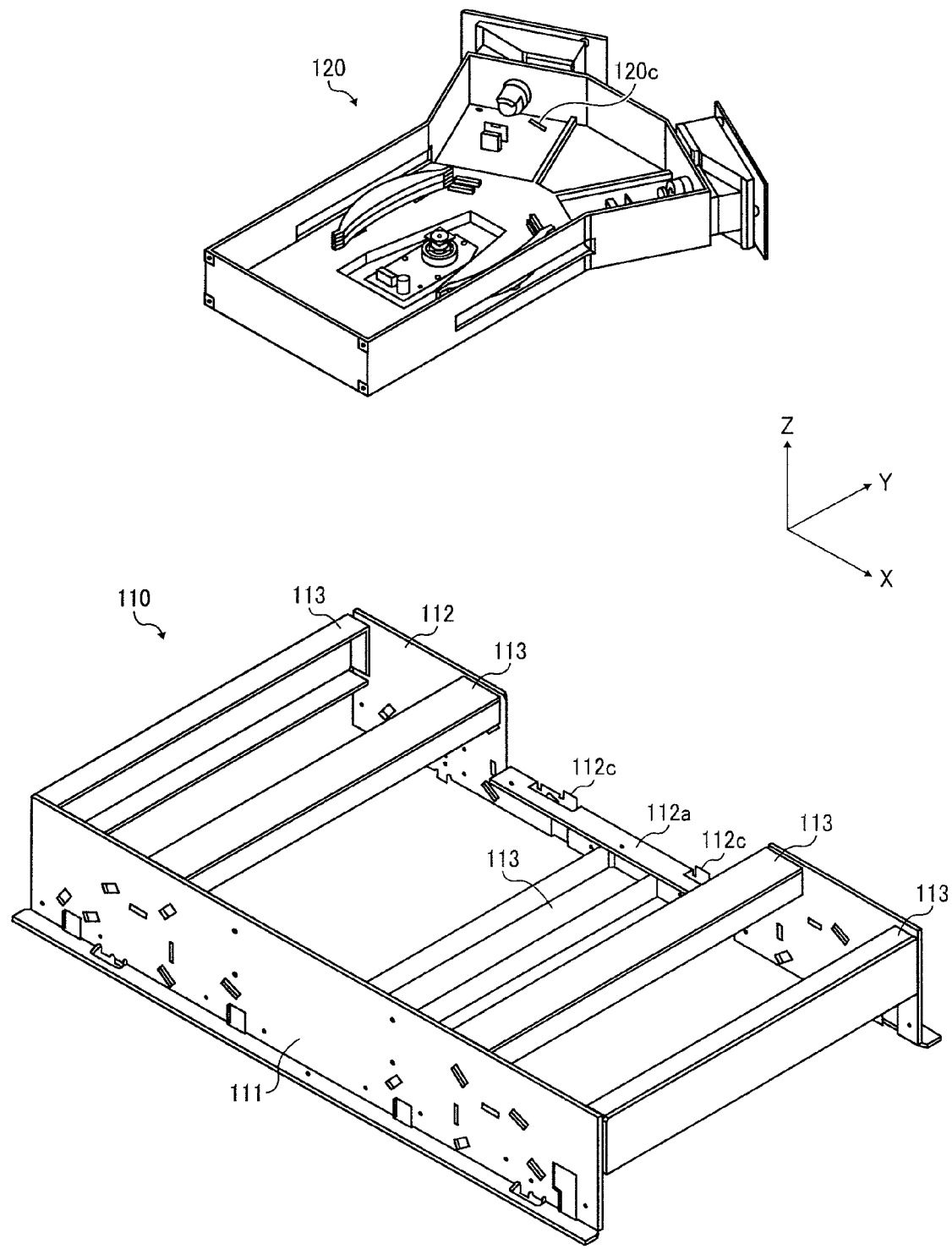
FIG. 5 is an exploded view showing the core housing and a sub housing.

FIG. 5 is an exploded view of the core housing 120 and the sub-housing 110. As shown in FIG. 5, the sub-housing 110 is made up of a pair of side plates 111, 112 which are formed by plate working and the like with the longitudinal direction being defined as the X axis, and five connection members 113 which connect the side plates 111, 112.

Each of the side plates 111, 112 is formed by plate working of a metallic plate and is provided with a plurality of openings. As shown in FIG. 5, in the central portion of the side plate 112 there is formed a notched part in rectangular shape. In the notched part there is provided a bent part 112a which is formed by partly bending the side plate 112 horizontally. Further, this notched part has formed therein two projections 112c which project upward from an upper surface of the bent part 112a.

Each of the connection members 113 has a U shape in cross section and both ends thereof are fixed to the side plates 111, 112 respectively, whereby the side plates 111, 112 are connected together in parallel with each other.

In the sub-housing 110 constituted as described above, the second scanning lenses 307A~307D, four in number and having constitution equivalent to each other, and a plurality of folding mirrors M are held.

Figure 6A:
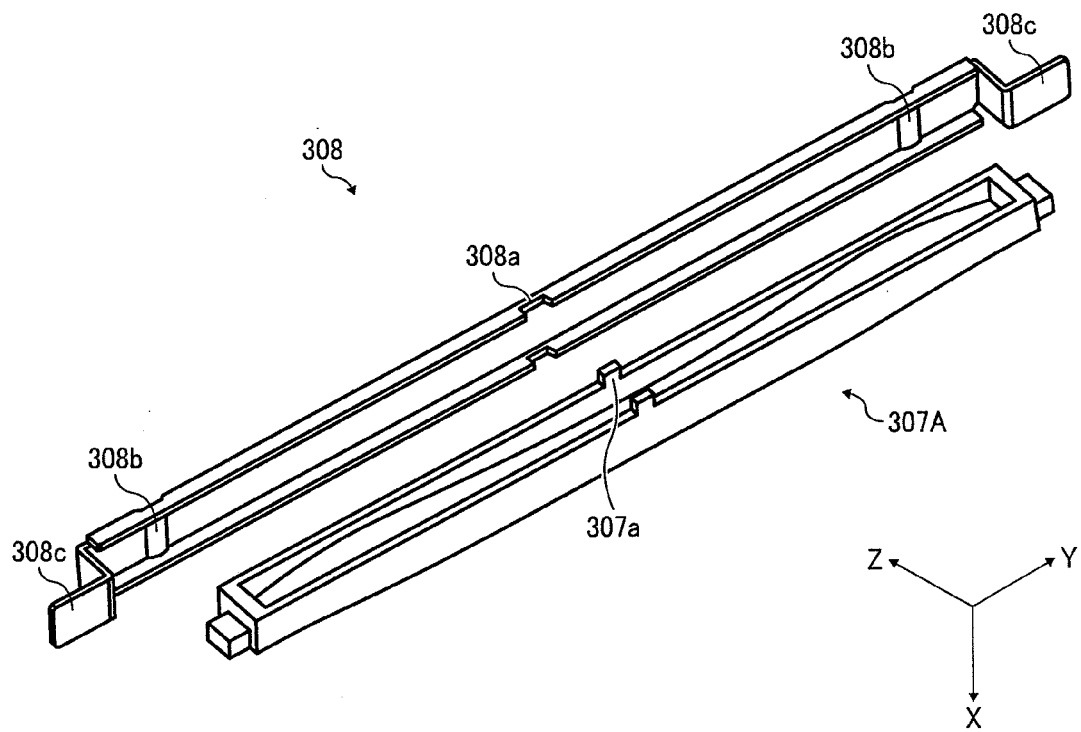
FIGS. 6A and 6B are perspective views showing how to mount a second scanning lens.

The second scanning lenses 307A~307D define the longitudinal direction as Y-axis direction, like the second scanning lens 307A as typically shown in FIG. 6A. The second scanning lens 307A is mounted on the sub-housing 110 through a bracket 308.

Figure 6B:
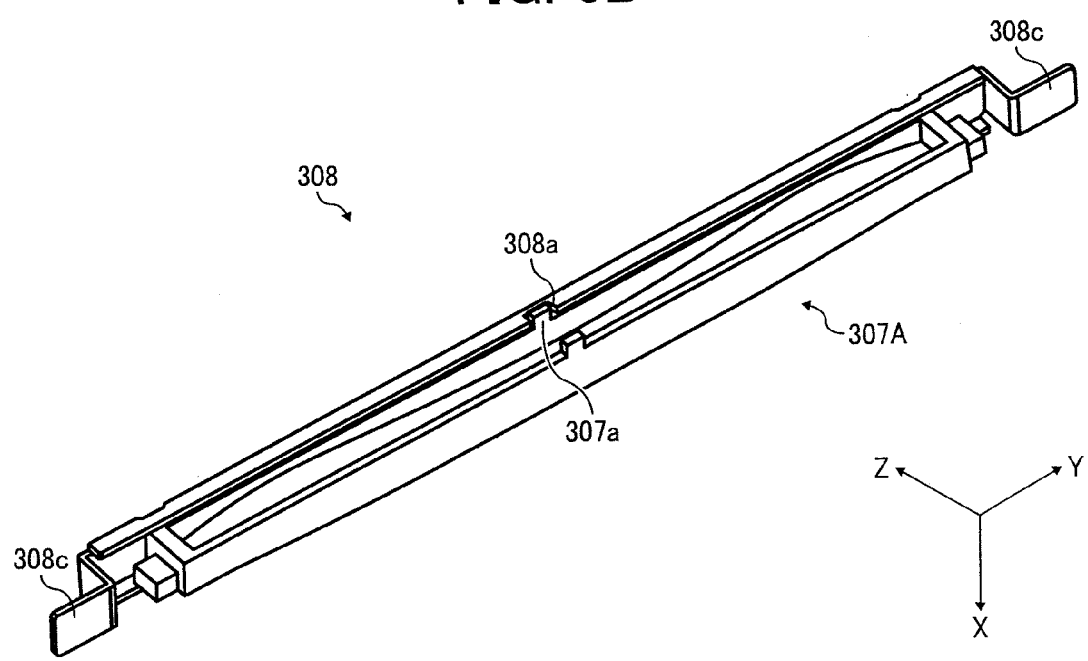

In this embodiment, as shown in FIG. 6A, the second scanning lens 307A has formed, in the central part thereof, projected portions 307a which project in the −X direction. The bracket 308 defines the longitudinal direction as Y-axis direction and, on both end portions thereof, there are formed engaging parts 308c which are to be engaged with openings formed in the side plates 111, 112 of the sub-housing 110. In the central part thereof there are formed notched portions 308a. The second scanning lens 307A is held by the bracket 308 in a state in which the projected portions 307a are fitted into the notched portions 308a formed in the bracket 308, thereby being positioned relative to the bracket, and further in a state in which both end portions of the second scanning lens 307A are held by supporting parts 308b formed in the bracket 308, as shown in FIG. 6B.

Figure 7A:
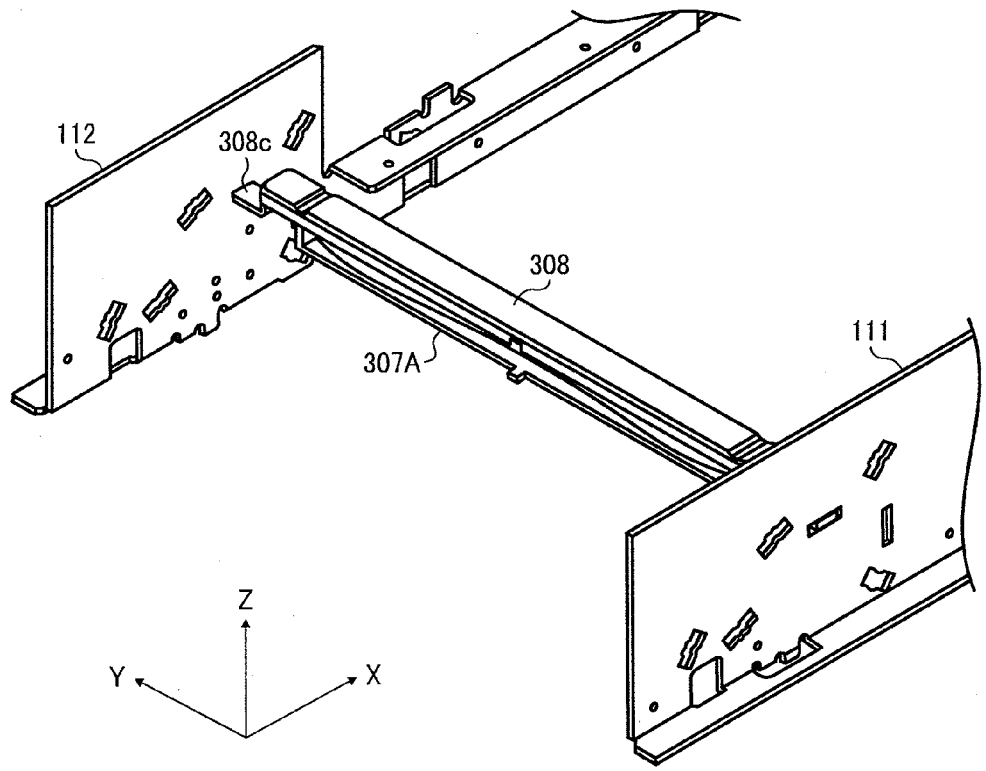
FIGS. 7A and 7B are a perspective view and a side view respectively showing how to mount the second scanning lens.
Figure 7B:
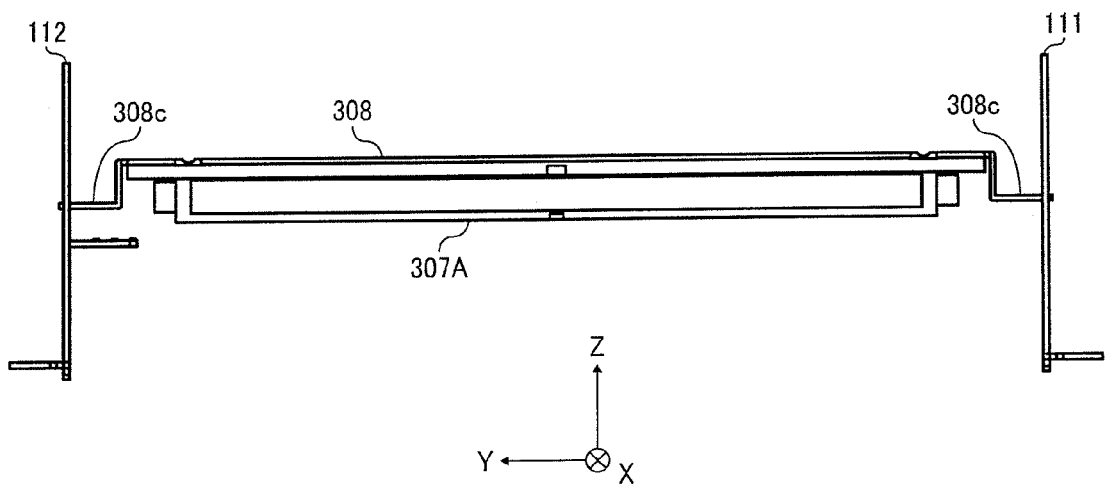

As can be seen when FIGS. 7A and 7B are taken together, the bracket 308 having held the second scanning lens 307A is bridged between the side plates 111, 112 in a state in which engaging parts 308c formed on both end portions of the bracket 308 are engaged with openings formed in the side plates 111, 112. The method of mounting the second scanning lens is disclosed in Japanese Patent No. 4027870.

The folding mirrors M are also bridged between the side plates 111, 112 in a state in which both end portions are engaged with openings formed in the side plates and are urged to be fixed by means of, e.g., elastic materials.

In the above-described core housing 120 and the sub-housing 110, as can be seen in FIG. 5, the core housing 120 is supported at the bottom surface thereof by the bent part 112a in a state in which projected parts 112c formed in the sub-housing 110 are inserted into slits 120c provided in the core housing 120, and is integrally fixed by fixing the side surface of the −Y side of the core housing 120 to the side plate 111 with bolts and the like (see FIG. 2).

Figure 8:
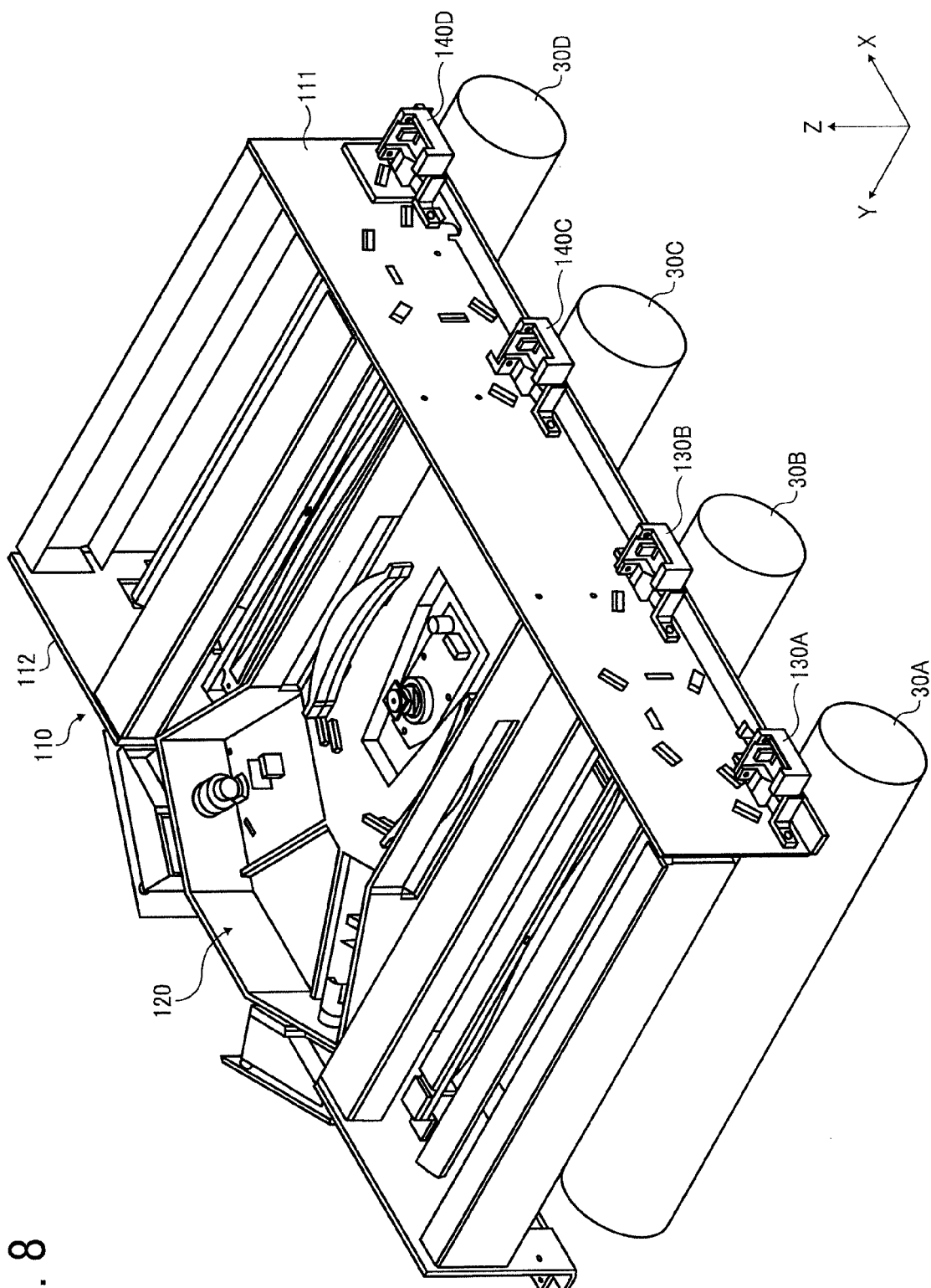
FIG. 8 is a perspective view showing a scanning position detection unit and a synchronization detection unit.

In this embodiment, as shown in FIG. 2, on the +Y side of the side plate 112 which constitutes the sub-housing 110, there are provided scanning position detection units 130C, 130D corresponding respectively to the photoreceptor drums 30C, 30D and synchronization detection units 140A, 140B corresponding respectively to the photoreceptor drums 30A, 30B. In addition, as shown in FIG. 8, on the −Y side of the side plate 111 which constitutes the sub-housing 110, there are provided scanning position detection units 130A, 130B corresponding respectively to the photoreceptor drums 30A, 30B and synchronization detection units 140C, 140D corresponding respectively to the photoreceptor drums 30C, 30D.

Figure 9:
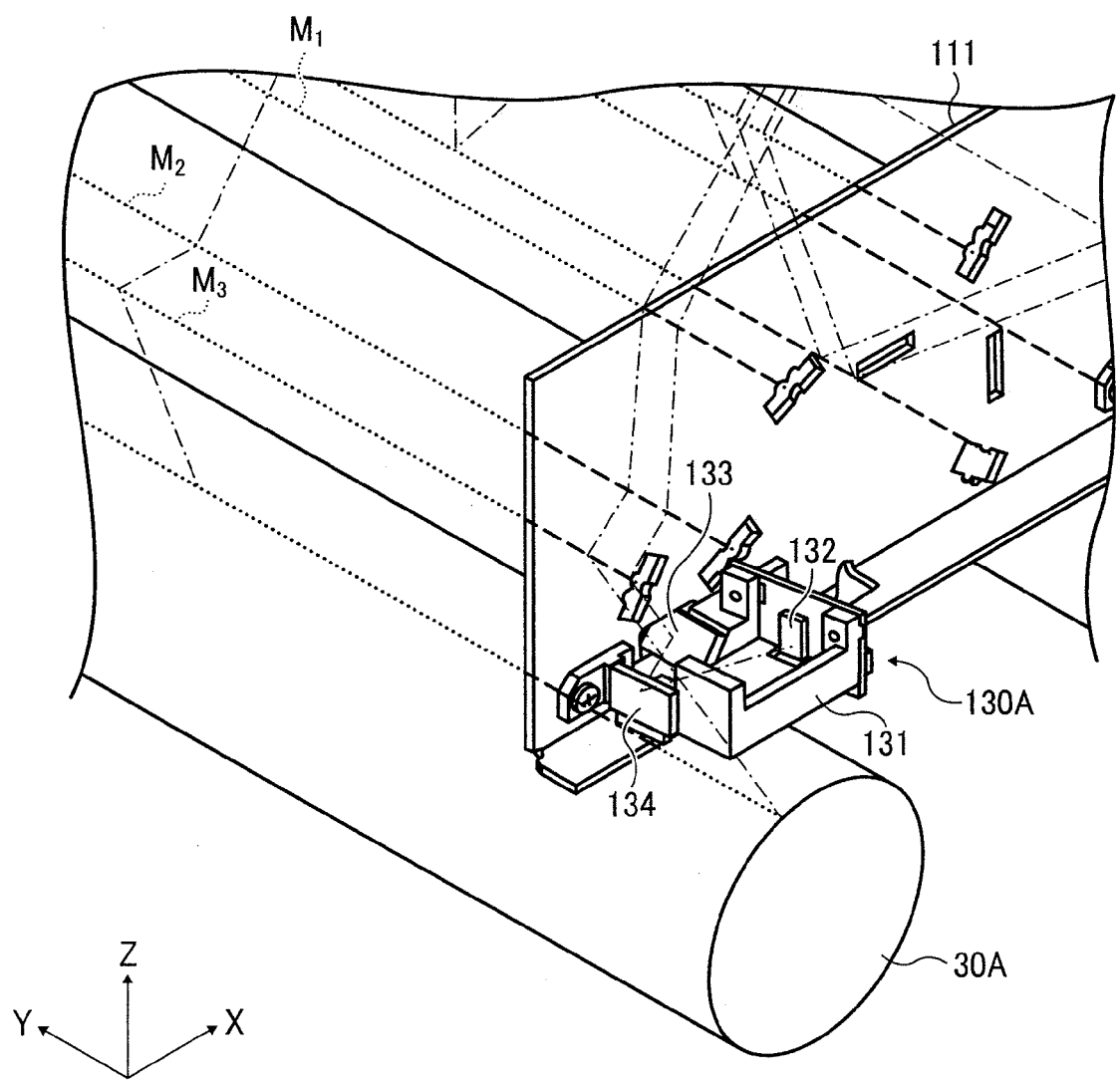
FIG. 9 is a perspective view showing how to mount the scanning position detection unit as well as the constitution thereof.

The scanning detection units 130A, 130B are made up of: a holder 131 which is attached to the side plate 111 like the scanning position detection unit 130A as typically shown in FIG. 9; a scanning position detection sensor 132 to be held by the holder 131; an optical path separating mirror 133; and a reflection mirror 134 which causes the laser beam, as reflected by the optical path separating mirror 133, to be entered the scanning position detection sensor 132.

The holder 131 can be made, e.g., of a raw material such as a low-cost resin or of a metal such as aluminum having a low coefficient of thermal expansion. The scanning position detection sensor 132, the optical path separating mirror 133, and the reflection mirror 134 are fixed to the holder 131 by means, e.g., of screws, springs, and the like or with adhesives, and the like. As shown in FIG. 9, the holder 131 is fixed to the side plate 111 in a state in which part of the optical path separating mirror 133 is inserted into an opening provided in the side plate 111.

Figure 10:
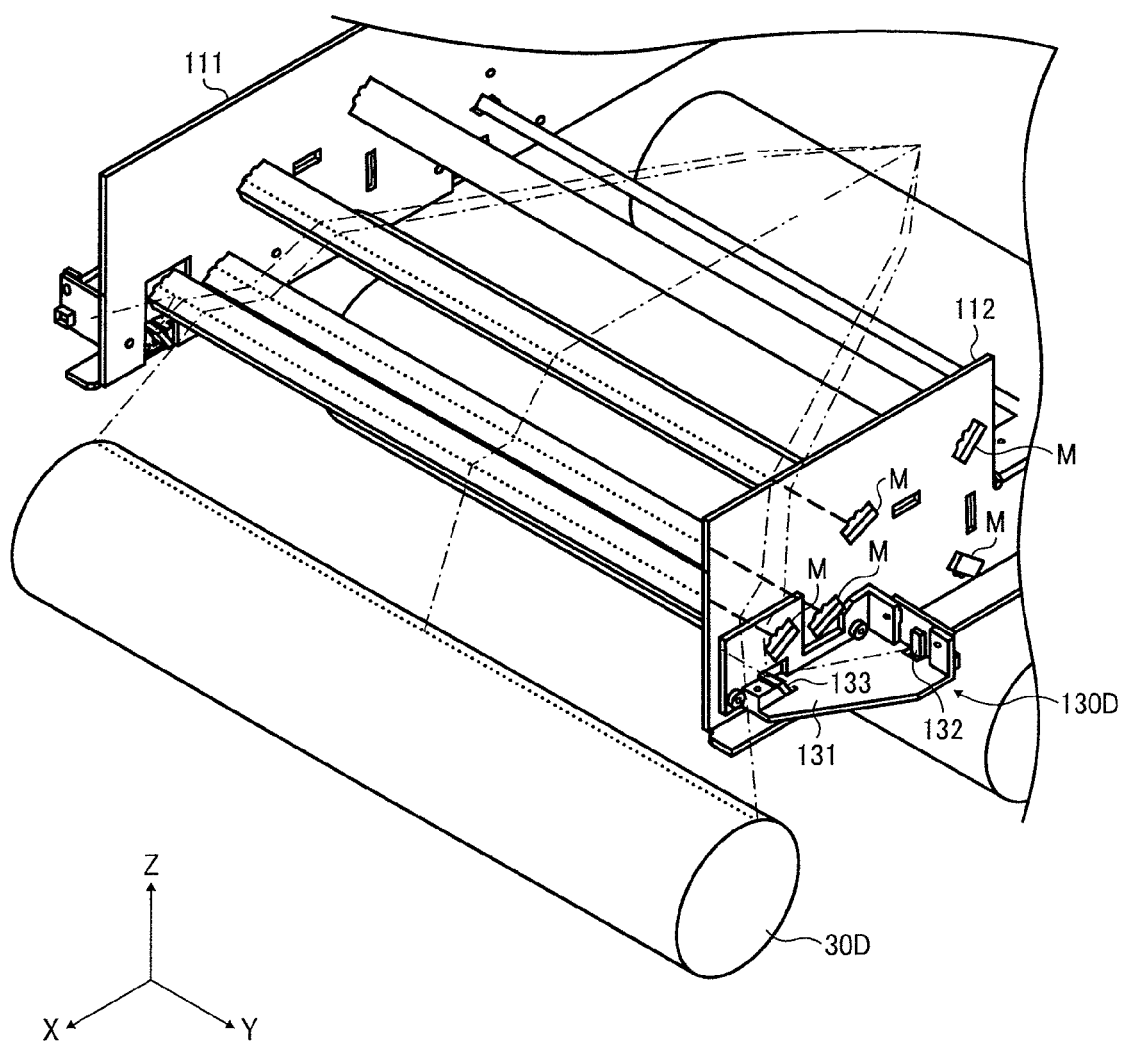
FIG. 10 is a perspective view showing how to mount the scanning position detection unit as well as the constitution thereof.

The scanning position detection units 130C, 130D are provided, as typically shown with reference to the scanning position detection unit 130D in FIG. 10, with: the holder 131 that is attached to the side plate 111l; and the scanning position detection sensor 132 and the optical path separating mirror 133 held by the holder 131.

The holder 131 can be made, e.g., of a raw material such as a low-cost resin or of a metal such as aluminum having a low coefficient of thermal expansion. The scanning position detection sensor 132 and the optical path separating mirror 133 are fixed to the holder 131 by means, e.g., of screws, springs, and the like or with adhesives, and the like. As shown in FIG. 10, the holder 131 is fixed to the side plate 112 in a state in which part of the optical path separating mirror 133 is inserted into an opening provided in the side plate 112.

The sensor to be used in the scanning position detection unit is disclosed in, e.g., JP-A-2005-208513.

Figure 12:
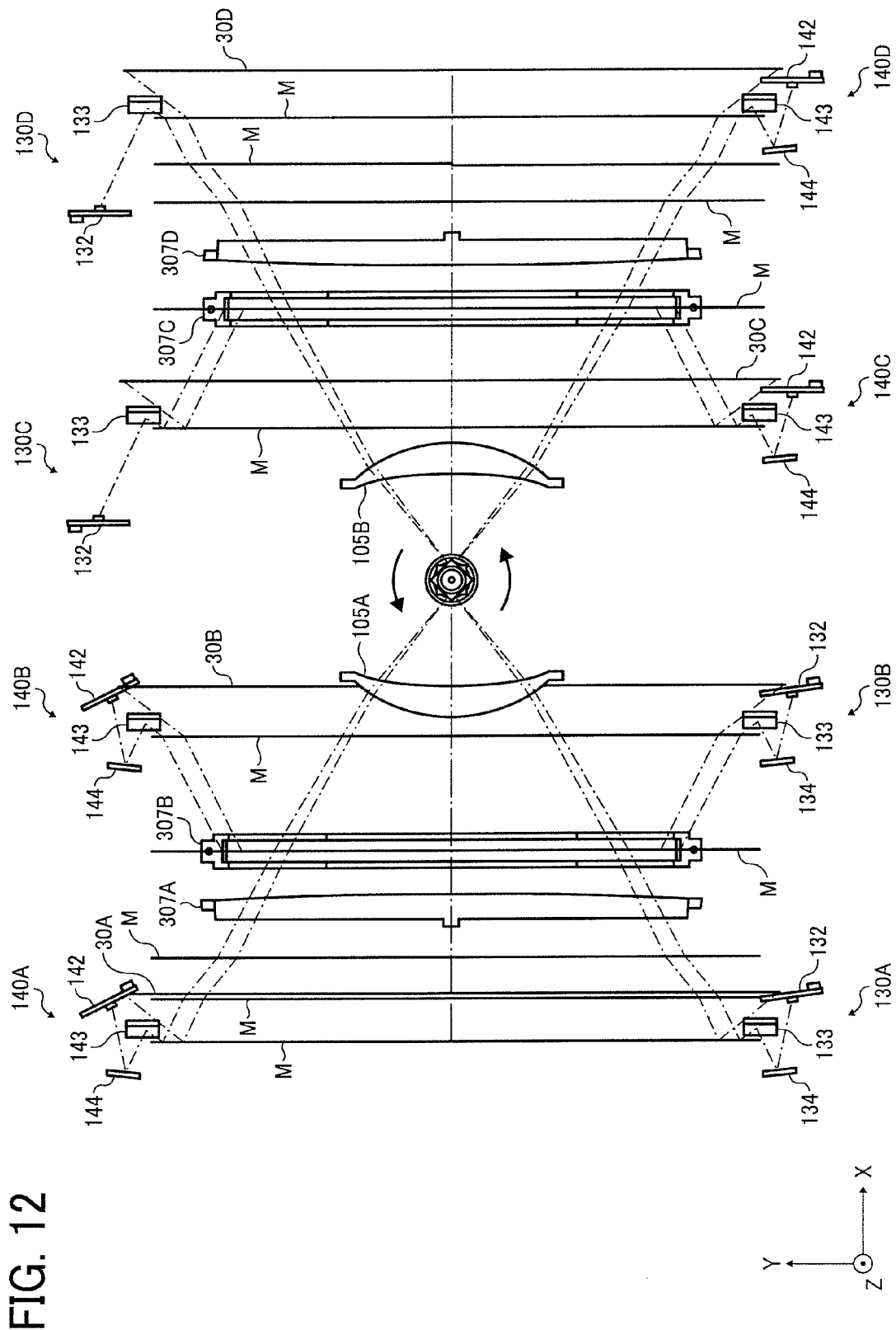
FIG. 12 is a schematic plan view showing the optical layout of the optical elements constituting the optical scanning apparatus.

Each of the synchronization detection units 140A-140D has: a holder to be attached to the side plate 112; a synchronization detection sensor 142; an optical path separating mirror 143; and a reflection mirror 144 that causes the laser beam as reflected by the optical path separating mirror 143 to become incident on the synchronization detection sensor 142 (see FIG. 12). The synchronization detection sensor 142 of the synchronization detection units 140A~140D, the optical path separating mirror 143, and the reflection mirror 144 are held, like the scanning position detection unit 130A, and the like, by the holders that are respectively fixed to the side plates 111, 112.

A description will now be made of the operation of the image forming apparatus 500 which is provided with the optical scanning apparatus 100 constituted as described above. When image information is supplied from an upstream apparatus and the like, a plurality of laser beams are respectively emitted from the light source devices 70A, 70B. The laser beams respectively emitted from the light source devices 70A, 70B are formed into a given beam shape by the aperture members 201A, 201B and are thereafter split by the split prisms 202A, 202B into two in the vertical direction. Each of the split laser beams is condensed by the cylinder lens units 203A, 203B into the deflection planes of the polygon mirror 104. The laser beams deflected by the polygon mirror 104 are respectively entered the first scanning lenses 105A, 105B. The polygon mirror 104 is rotated by a motor and the like in the counterclockwise direction.

Figure 11:
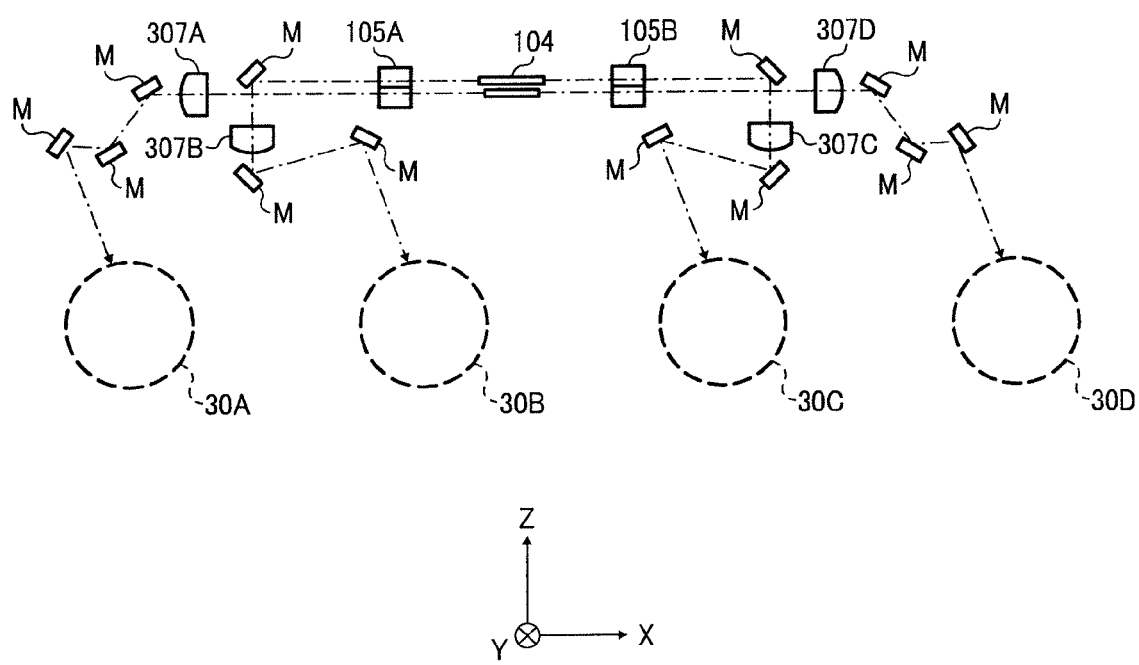
FIG. 11 is a schematic plan view showing an optical layout of the optical elements constituting the optical scanning apparatus.

The upper-side laser beam incident on the first scanning lens 105A is, as can be seen from optical layouts in FIGS. 11 and 12, incident on the second scanning lens 307B and is thereafter condensed to the surface of the photoreceptor drum 30B. On the other hand, the lower-side laser beam entered the second scanning lens 105A is incident on the second scanning lens 307A and is thereafter condensed to the surface of the photoreceptor drum 30A. In this embodiment, the polygon mirror 104 has a phase difference of 45 degrees between the upper and lower deflection planes. Therefore, the scanning of the photoreceptor drum 30B by the upper-side laser beam and the scanning of the photoreceptor drum 30A by the lower-side laser beam are arranged to be carried out alternatively in the +Y direction based on the change in the synchronization signal from the synchronization detection units 140A, 140B. The synchronization signal is a signal to become low level when the laser beam is incident on the synchronization detection sensor 142 of the synchronization detection units 140A, 140B through optical path separating mirror 143 and the reflection mirror 144.

Further, the upper-side laser beam incident on the first scanning lens 105B is incident on the second scanning lens 307C and is thereafter condensed to the surface of the photoreceptor drum 30C. The lower-side laser beam incident on the first scanning lens 105B is incident on the second scanning lens 307D and is thereafter condensed to the surface of the photoreceptor drum 30D. In this embodiment, the polygon mirror 104 has a phase difference of 45 degrees between the upper and lower deflection planes. Therefore, the scanning of the photoreceptor drum 30C by the upper-side laser beam and the scanning of the photoreceptor drum 30D by the lower-side laser beam are arranged to be carried out alternatively in the +Y direction based on the change in the synchronization signal from the synchronization detection units 140C, 140D.

The photoreceptor layers on the surface of the photoreceptor drums 30A~30D are charged at a given voltage by the chargers 32A~32D. As a result, electric charges are distributed at a certain charge density. As described above, when the photoreceptor drums 32A~32D are respectively scanned, the photoreceptor layer concentrated by the laser beam becomes electrically conductive, and the electric potential at that particular portion becomes substantially zero. Therefore, as a result of scanning of the photoreceptor drums 30A~30D rotating in the direction of the arrows in FIG. 1, by the laser beam modulated by the image information, there are formed on the surfaces of the respective photoreceptor drums 30A~30D electrostatic latent images to be defined by the distribution of electric charges.

When the electrostatic latent image has been formed on the surfaces of the respective photoreceptor drums 30A~30D, the surfaces of the respective photoreceptor drums 30A~30D are supplied with toner by means of the developing rollers of the toner cartridges 33A~33D. At this time, since the respective developing rollers of the toner cartridges 33A~33D are charged with voltage in the reverse polarity, the toner adhered to the developing rollers are charged in the same polarity as the photoreceptor drums 30A~30D. Therefore, the toner will not be adhered to the portion in which the electric charges are distributed, among the surfaces of the photoreceptor drums 30A~30D, but will be adhered only to the scanned portion. In this manner, there will be formed on the surfaces of the photoreceptor drums 30A~30D images visualizing the electrostatic latent images.

As mentioned above, each of the toner images formed in the first station, in the second station, in the third station, and in the fourth station is transferred to the surface of the transfer belt 40 in a manner overlapped with one another, and is transferred to the surface of the paper 61 picked up from the paper feed tray 60, and is thereafter fixed by the fixing rollers 50. The paper 61 on which the image has been formed is discharged by the paper discharge rollers 58 and is stacked in sequence in the paper discharge tray 501a.

Further, in this embodiment, it is so arranged that, once the scanning of the main scanning regions in the photoreceptor drums 30A~30D has been finished, the deflection-scanned laser beam is configured to be entered the scanning position detection sensor 132 of the scanning position detection units 130A~130D through the optical path separating mirror 133 and the reflection mirror 134.

Figure 13:
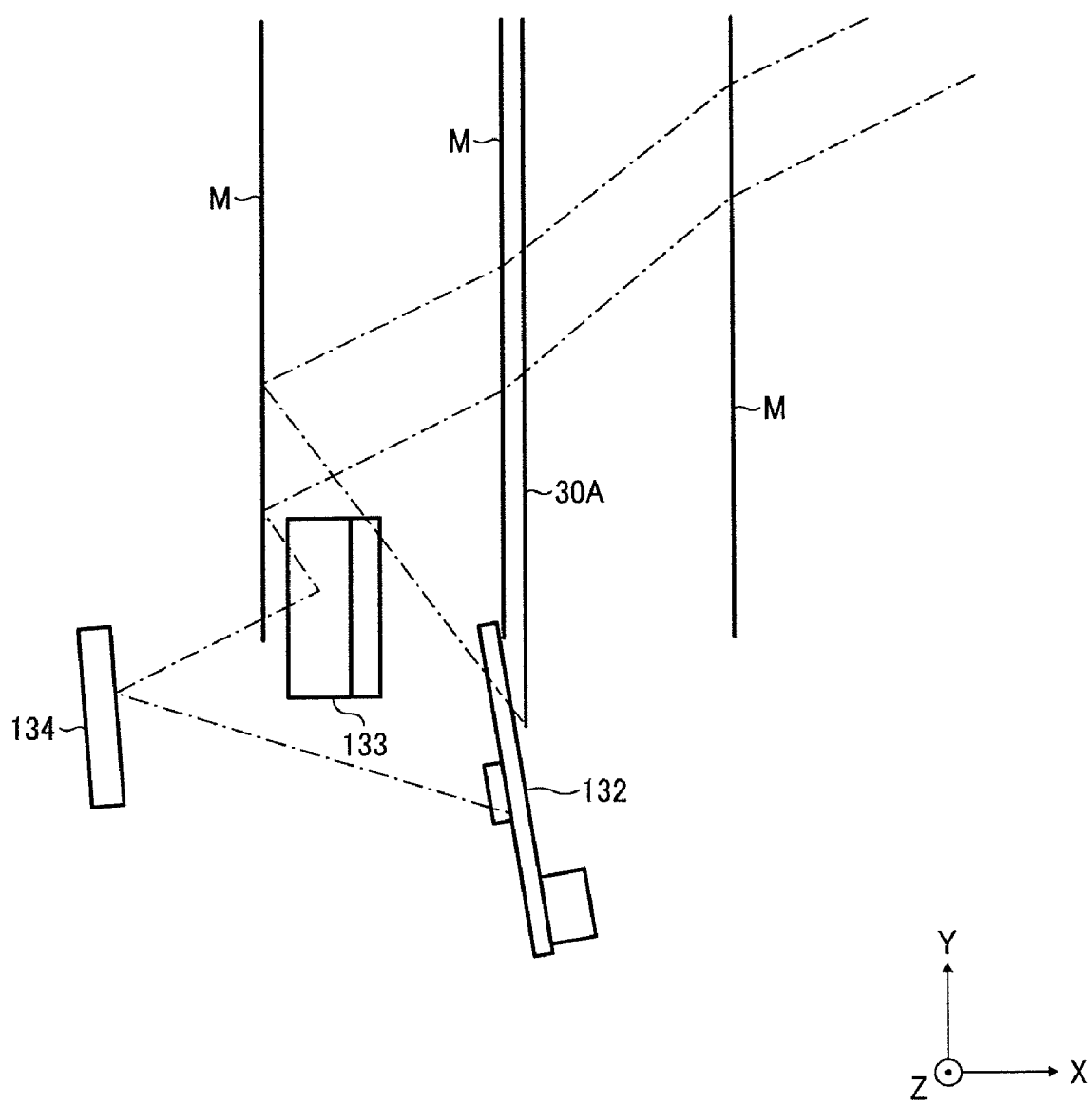
FIG. 13 is a schematic diagram showing how the laser beam is received by a scanning position detection sensor of the scanning position detection unit.

FIG. 13 is a layout showing a state in which the laser beam is received by the scanning position detection sensor 132 of the scanning position detection unit 130A. As shown in FIG. 13, the laser beam is arranged to be incident on the scanning position detection sensor 132 after being branched by the optical path separating mirror 133 through the reflection mirror 134. In this embodiment, it is so arranged that the reflection mirror 134 and the scanning position detection sensor 132 are disposed on the same plane that is parallel with the XY plane, and that the optical path of the laser beam between the reflection mirror 134 and the scanning position detection sensor 132 is parallel with the XY plane.

As described hereinabove, according to this embodiment, the scanning position detection sensor 132 that receives the deflected laser beam, and the optical path separating mirror 133 and the reflection mirror 134 that cause the laser beam to be incident on the scanning position detection sensor 132 are integrally held by the holder 131. This holder 131 is, in turn, fixed to the sub-housing 110 in which the second scanning lenses 307A~307D and a plurality of folding mirrors M are housed. According to this configuration, the positional relationship of the scanning position detection sensor 132 relative to the optical path separating mirror 133 and the reflection mirror 134 can be maintained constant. Accordingly, it becomes possible to detect the laser beam with high accuracy by means of the scanning position detection sensor 132 and, as a result, it is possible to detect with high accuracy the scanning position of the laser beam.

In addition, in this embodiment, the scanning position detection units 130A~130D and optical path separating mirror 143 of the synchronization detection units 140A~140D are partly inserted into the openings formed in the side plates 111, 112. Therefore, the sub-housing 110 can be minimized.

In addition, in this embodiment, the laser beam that has passed through the folding mirror M that is the closest to the photoreceptor drums 30A~30D is introduced into the scanning position detection sensor 132 and synchronization detection sensor 142 through the optical path separating mirror 133 of the scanning position detection units 130A~130D and the optical path separating mirror 143 of the synchronization detection units 140A~140D. Therefore, it becomes possible to maintain constant the optical positional relationship of the photoreceptor drums 30A~30D relative to the scanning positional detection units 130A 130D and synchronized detection units 140A~140D.

In addition, in this embodiment, the reflection mirror 134 and the scanning position detection sensor 132 are disposed in a plane parallel with the XY plane, and the optical path of the laser beam between the reflection mirror 134 and the scanning position detection sensor 132 is arranged to be parallel with the XY plane. Therefore, the degree of freedom in laying out the optical elements contained in the scanning positional detection units 130A~130D and synchronized detection units 140A~140D can be improved.

Further, in this embodiment, as shown in FIG. 10, the holder 131 fixed to the side plate 112 holds the folding mirror M that is the closest to the photoreceptor drum 30D. According to this configuration, the positional relationship between the scanning position detection sensor 132 and the folding mirror M can be maintained constant. It is to be noted that the folding mirror M to be held by the holder 131 may alternatively be a folding mirror on an upstream side of the folding mirror M.

In this embodiment, the optical scanning apparatus 100 is provided with the core housing 120 and the sub-housing 110. Without being limited thereto, a housing in which the core housing and the sub-housing are integrally constituted may be used.

The material making the holder 131 for the scanning position detection units 130A~130D may be a resin or a metal such as aluminum and the like. However, in case the relative positional relationship among each of the elements is maintained with a high accuracy, it is preferable to use aluminum and the like. In addition, in case the holder 131 must be positioned with high accuracy relative to the side plates 111, 112, it is preferable to provide the side plates 111, 112 with positioning means such as through holes or half blanking for positioning purpose, or embossing and the like. Furthermore, in case there is a possibility that the laser beam is not entered the scanning position detection sensor 132 due to errors in fixing postures of the first scanning lenses 105A, 105B, the second scanning lenses 307A~307D, the folding mirrors M, the optical path separating mirror 133 and the like, the following steps shall preferably be taken. That is, instead of providing the side pates 111, 112 with the positioning means, the adjustments shall first be made of the posture and the position of the holder 131. Thereafter, the holder 131 is fixed.

Generally speaking, the members made of plate works (e.g., the side plates 111, 112 and the like) are as thin as about 1~2 mm and, therefore, are superior in heat dissipation and, as compared with the material (e.g., aluminum and the like) in which the core housing 120 is made, are small in coefficient of thermal expansion. Therefore, the folding mirrors M, the second scanning lenses 307A~307D, the scanning position detection sensor 132, the optical path separating mirror 133 and the like are less likely to be influenced by the effects of heat generated in the light source devices 70A, 70B assembled to the housing 120, and in the driving mechanism (not illustrated) for the polygon mirror 104 and the like. As a result, it becomes possible to prevent each of the elements from changing in assembly position or assembly posture.

In addition, in this embodiment, on the inside of the side plates 111, 112 there are housed the folding mirrors M, the second scanning lenses 307A~307D, and the core housing 120, leaving a small allowance in space. In particular, the bracket 308 for holding the second scanning lenses 307A~307D and the folding mirrors M are supported in a bridged manner. Therefore, in the sub-housing 110, it is difficult to dispose the scanning position detection units 130A~130D and the synchronized detection units 140A~140D on the outside of both ends of the bracket 308 and the folding mirrors M. As a solution, it is preferable to cause the laser beam to pass through the through holes formed in the side plates 111, 112. In this manner, the laser beam can be emitted outside the side plates 111, 112 and then be appropriately folded at the optical path separating mirrors 133, 143 and the reflection mirrors 134, 144, to thereby introduce the laser beam to the scanning position detection sensor 132.

Another advantage of employing this kind of configuration is as follows. In assembly at the workshop, in case the laser beam is not entered the scanning position detection sensor due to errors in assembling the folding mirrors M, optical path separating mirrors and the like, as well as due to dimensional errors in the holders to hold the above parts, it becomes easier to adjust the mounting positions of the scanning position detection sensors and the holders. It becomes thus possible to surely cause the laser beam to become incident on the scanning position detection sensors.

In addition, as described above, the optical path separating mirror 133 that is disposed closest to the folding mirror M preferably has a construction of being inserted into the through holes formed in the surfaces of the side plates 111, 112. For example, in a construction in which the laser beam as reflected by the folding mirror M is separated by the optical path separating mirror 133, if the construction is employed in which the optical path is separated at a position closer to the surface to be scanned in the optical path from the folding mirror M closest to the surface to be scanned to the surface to be scanned, the Z-direction height of the optical scanning apparatus will become large (i.e., to be enlarged downward or toward the photoreceptor drum), thereby resulting in an increase in the apparatus size. In this embodiment, however, since the optical path can be separated at a position nearer to the folding mirror M that is the closest to the surface to be scanned, the laser beam path can be set at a high position. In other words, the holders for each of the units 130A~130D, 140A~140D can be mounted at a position away from the photoreceptor drums. As a result, the optical scanning apparatus can be reduced in height (the apparatus can be minimized in size).

In addition, the farther away from the folding mirror that is the closest to the surface to be scanned (i.e., becomes closer to the photoreceptor drum), the width to be scanned by the laser beam becomes wider. Therefore, by disposing the optical path separating mirror at a position closer to the folding mirror that is the closest to the surface to be scanned, the width in the Y direction (main scanning direction) can also be reduced.

Further, it is normal practice to dispose the units such as the developing unit, the charging unit and the like, in the space between the optical scanning apparatus and the photoreceptor drum. For the above reason, it is preferable to enlarge this space and, in this embodiment, it becomes possible to secure the above space.

In addition, as described hereinabove, the laser beam is reflected in this embodiment by the folding mirror that is the closest to the surface to be scanned and is, thereafter, deflected by the optical path separating mirror 133 (see FIG. 13). By employing this kind of configuration, it is possible to make the optical properties of the scanning position detection sensor 132 similar to those of the surface to be scanned. In particular, even in case changes occur, due to temperature changes and the like, to the mounting posture of the folding mirror M that affect the sub scanning position at the surface to be scanned and that is the closest to the surface to be scanned, the changes in the sub scanning position accompanied by the change in the mounting posture can be detected. On the other hand, in a configuration in which the optical path is separated on the upstream side of the folding mirror that is the closest to the surface to be scanned to thereby introduce the laser beam in the scanning position detection sensor, it is impossible to detect the scanning position changes accompanied by the mounting posture of the folding mirror that is the closest to the surface to be scanned.

Further, the closer to the surface to be scanned (particularly, in the main scanning direction), the smaller the beam diameter of the laser beam (the light flux width becomes narrower), and the wider the distance between the principal rays of the laser beam reaching each of the image height. Therefore, in disposing the optical path separating mirror 133, there can be secured an allowance for optical path separation between the scanning laser beam incident on the surface to be scanned and detection laser beam incident on the scanning position detection sensor 132. As a result, detection laser beam can be easily introduced into the outside of the side plates 111, 112. In other words, it is preferable to dispose the optical path separating mirrors 133, 143 within the optical path right after the laser beam has been reflected by the folding mirror that is the closest to the surface to be scanned.

FIG. 9 illustrates the folding mirrors M by solid lines. The laser beam that has been reflected by the folding mirror $M_3$ that is the closest to the surface to be scanned is deflected by the optical path separating mirror 133. The optical path of the detection laser beam is arranged to be laid out on a plane (XY plane) which is vertical to the rotary shaft of the polygon mirror 104. For that purpose, the optical path separating mirror 133 is disposed in a manner inclined only about the rotary shaft (Y axis) which is parallel with the inclination of the folding mirror $M_3$ that is the closest to the surface to be scanned. The reflection mirror 134 is integrally held by the holder 131 together with the scanning position detection sensor 132 in a state in which the reflection mirror 134 is inclined only about the rotary shaft (Z axis) which is parallel with the rotary shaft of the polygon mirror 104. In this embodiment, the optical path separating mirror 133 is disposed inclined about the Y axis, but the optical path of the detection laser beam may be arranged to be laid out within the XY plane by disposing the optical path separating mirror 133 in an inclined manner about a rotary shaft which crosses at right angles to the rotary shaft of the polygon mirror (Z axis).

By employing this kind of configuration, the layout design of the optical path of the detection laser beam can be made easier, and the holder 131 can be simplified in shape. The scanning position detection sensor 132 is set in mounting posture such that the detection laser beam will not be incident vertically. According to this configuration, the detection laser beam can be prevented from being vertically incident and the consequent return light thereof from varying the output properties of the light source or from giving rise to the occurrence of ghost light on the surface to be scanned.

For example, as disclosed in JP-A-2005-208513, in case, as a scanning detection sensor, a sensor is utilized which detects the time for the laser beam to scan the photoreceptor section, the scanning position sensor shall preferably be disposed so as to be, in the main scanning direction, at an angle of incidence equivalent to the surface to be scanned. According to this configuration, the scanning velocity on the surface to be scanned and on the scanning position detection sensor can be made substantially equal to each other.

In addition, as described above, in this embodiment, the folding mirror M that is the closest to the surface to be scanned is supported by the holder 131 as shown in FIG. 10. According to this configuration, even if the mounting posture may vary due to a change after a lapse of time, the relative positional relationship between the folding mirror M that is the closest to the to the surface to be scanned and the optical elements 132, 133 held by the holder 131 does not change. Therefore, the relationship between the scanning position change on the surface to be scanned and the scanning position change in the scanning position detection units 130A~130D can be well maintained.

In the apparatus provided with a plurality of folding mirrors M as in the scanning apparatus of this embodiment, the change in the mounting posture of the folding mirror that is the closest to the surface to be scanned generally affects the optical properties (particularly, the scanning line position) of the surface to be scanned. Therefore, it is preferable that the folding mirror that is the closest to the surface to be scanned is supported by the holder 131. Further, in a station in which the heat source such as the fixing units and the like of the image forming apparatus main body are disposed nearby, there is a possibility that the side plates of the sub-housing, even if they are made of plate-worked parts, are subject to the heat generation of the fixing unit and the like. Therefore, the above-described preferable configuration shall be employed in a station which is likely to be subject to heat generation by the heat sources.

In this embodiment, a configuration has been employed in which the folding mirror that is the closest to the surface to be scanned is supported by the holder 131 in a bridged manner. However, depending on the layout of the heat source, a configuration may be employed in which another folding mirror is supported by the holder 131 in a bridged manner. Furthermore, in this embodiment, the folding mirror that is the closest to the surface to be scanned is supported in a bridged manner by the synchronization detection unit 140D fixed to the side plates 111, 112, and the holder 131 of the scanning position detection units 130D. Depending on the layout of the heat source, a configuration may be employed in which the folding mirror that is the closest to surface to be scanned is supported on one of the side plates 111, 112 by the through holes formed in the side plates and, on the other of the side plates, by the holder of the scanning position detector unit and by the holder of the synchronization detection unit.

In this embodiment, a description has been made of an example in which the scanning position detection units 130A~130D and the synchronization detection units 140A~140D are disposed on the outside of the side plates 111, 112. In the case of an optical scanning apparatus in which an allowance in space is secured relatively sufficiently, the scanning position detection units 130A~130D and the synchronization detection units 140A~140D may be disposed on the inside of the side plates 111, 112.

In the image forming apparatus according to this embodiment, the effects of the temperature change after a lapse of time on the layout position of the unit to detect the laser beam can be kept under control. Therefore, it becomes possible for each of the units to detect the laser beam position on the surface to be scanned (particularly, in the sub scanning direction) with high precision. In an image forming apparatus, particularly in a color image forming apparatus, in which this kind of optical scanning apparatus is utilized as an exposure device in an electrophotographic process, it becomes possible to reduce the occurrence of the relative positional deviation among the positions of the scanning lines that scan the photoreceptor drums corresponding to the respective colors. As a result, it is possible to obtain a high grade of output image that is free from "color drift" of each color of toner.

In the above embodiment, a description has been made of the image forming apparatus 500, provided with a plurality of photoreceptors 30A~30D, for forming a multi-color image. Without being limited thereto, the invention can also be applied to an image forming apparatus in which a monochromatic image is formed by scanning, e.g., a single photoreceptor with a plurality of laser beams.

In addition, in the above embodiment, a description has been made of a case in which the optical scanning apparatus 100 of the invention is used as a printer. The invention can also be applied to an image forming apparatus other than a printer, i.e., to a copying machine, a facsimile, or a composite machine having integrated them together.

What is claimed is:

1. An optical scanning apparatus for scanning a surface to be scanned, comprising:
   a light source that emits a laser beam;
   a deflector that deflects the laser beam emitted from the light source;
   a plurality of scanning optical elements that introduce the deflected laser beam to a surface to be scanned;
   a housing that holds therein at least one of the light source, the deflector, and the scanning optical elements;
   a sensor that receives the deflected laser beam;
   a mirror that introduces the deflected laser beam to the sensor; and
   a holder that holds the sensor and the mirror integrally, the holder being formed separately from the housing, and the holder being attached to the housing,
   wherein the holder is attached to the housing in a state in which at least part of the mirror is inserted into the housing.

2. The optical scanning apparatus according to claim 1, wherein the housing includes: a first unit that holds therein at least one of the light source and the deflector; and a second unit that holds therein the scanning optical elements.

3. The optical scanning apparatus according to claim 2, wherein the second unit includes a plate member formed by press-working and wherein the holder is held in position by a blanked surface of the plate member.

4. The optical scanning apparatus according to claim 3, wherein the laser beam is introduced to the sensor through an opening provided in the plate member.

5. The optical scanning apparatus according to claim 1, further comprising a separating element for separating the laser beam that has passed, among the plurality of scanning optical elements, through the scanning optical element closest to the surface to be scanned, and wherein the holder holds the separating element and the mirror introduces the laser beam separated by the separating element to the sensor.

6. The optical scanning apparatus according to claim 5, wherein the deflector is configured to rotate about a given axis, and wherein the optical path of the laser beam that is reflected by the mirror is at right angles to the axis.

7. The optical scanning apparatus according to claim 1, wherein the holder holds any one of the scanning optical elements.

8. An image forming apparatus in which a toner image formed based on a latent image to be obtained from information relating to an image is fixed to a recording medium, thereby forming an image, the apparatus comprising:
   the optical scanning apparatus according to claim 1;
   a photoreceptor on which the latent image is formed by the optical scanning apparatus;
   a developing unit that makes visible the latent image formed on the surface to be scanned of the optical scanning apparatus; and
   a transfer unit that fixes the toner image made visible by the developing unit to the recording medium.

* * * * *